Jan. 14, 1947.  J. J. MEGAL  2,414,316
TWISTED BELT AGITATOR
Filed Aug. 31, 1946  2 Sheets-Sheet 1
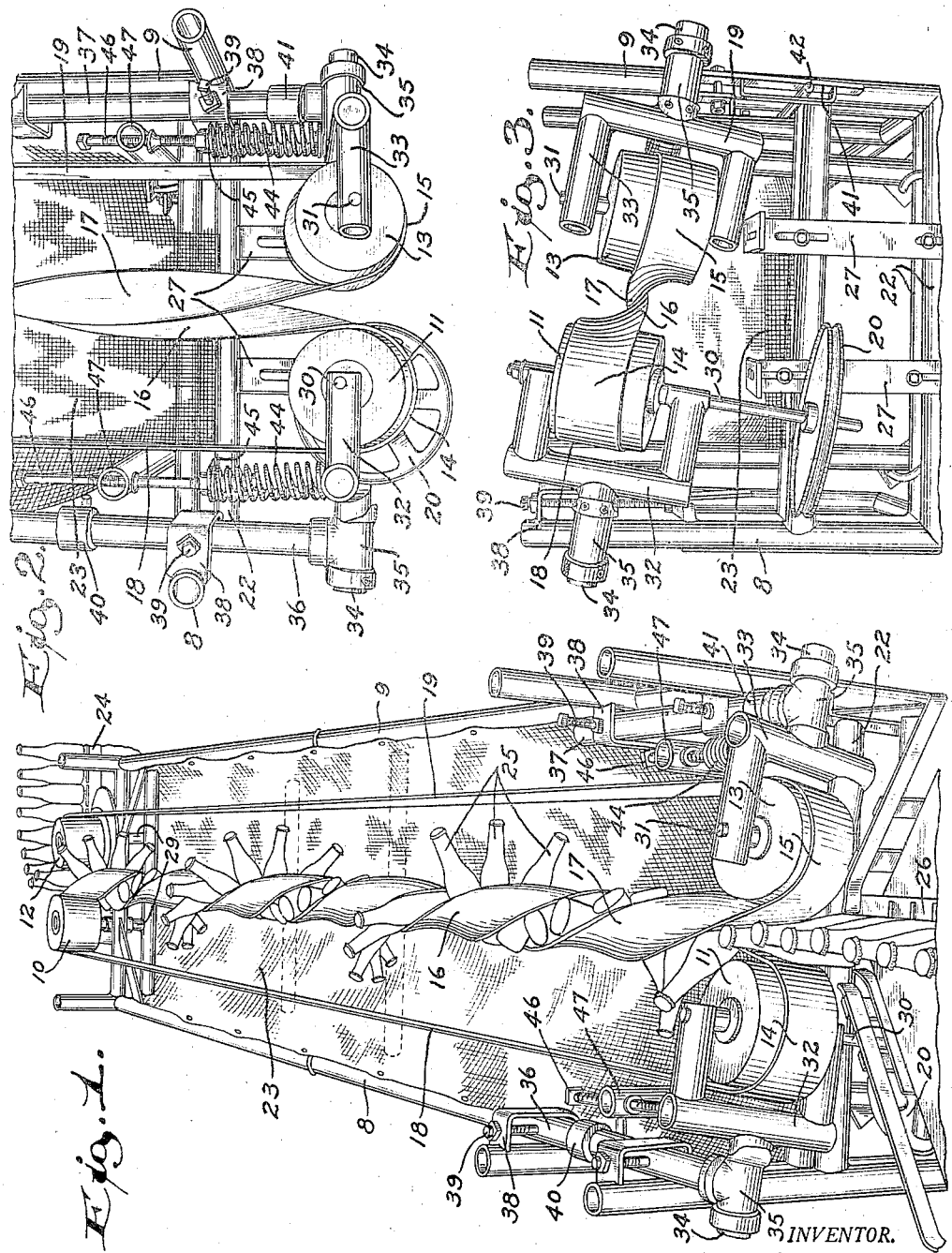
INVENTOR.
Joseph J. Megal
BY
Lieber & Lieber
ATTORNEYS Jan. 14, 1947. J. J. MEGAL 2,414,316
TWISTED BELT AGITATOR
Filed Aug. 31, 1946 2 Sheets-Sheet 2
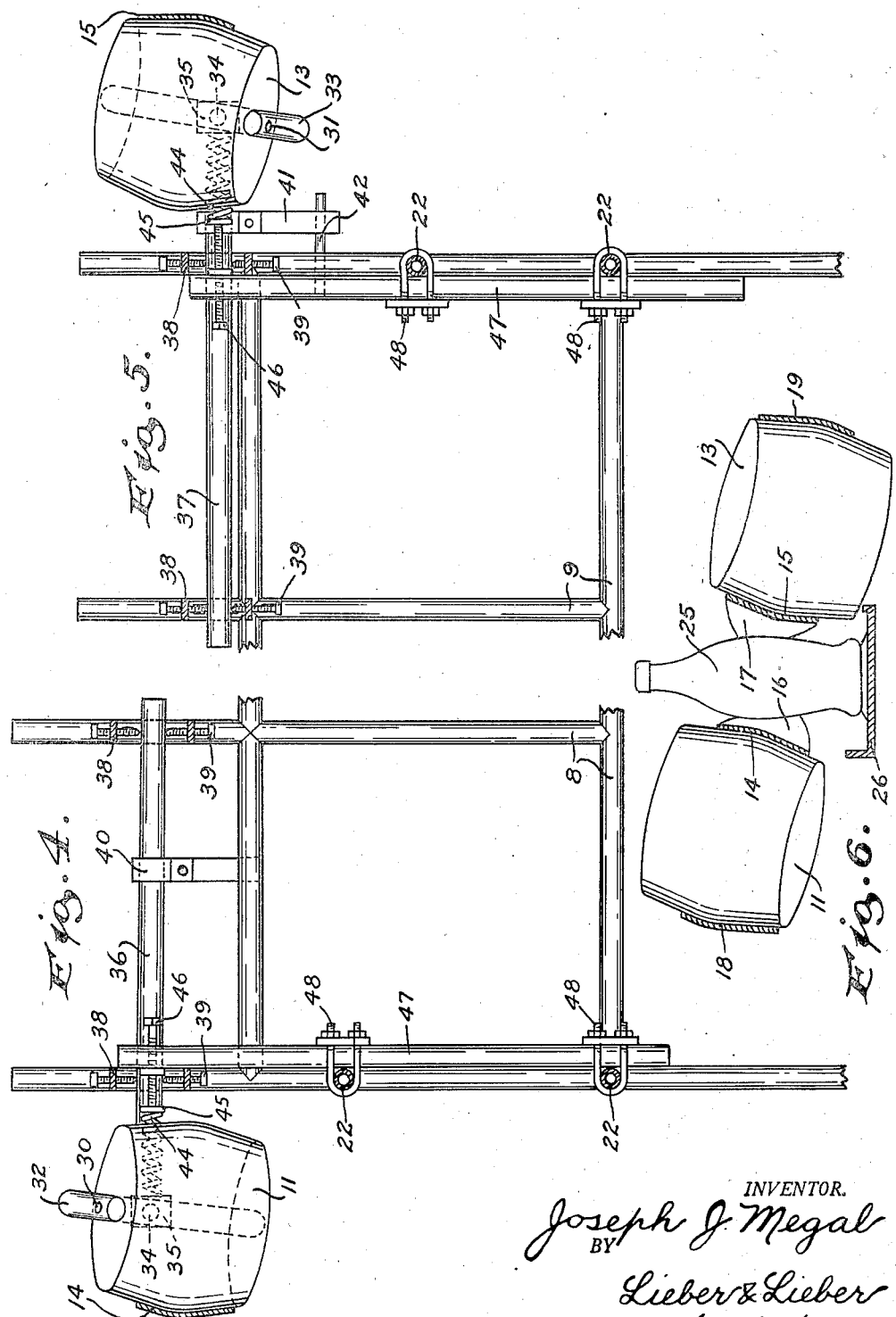
INVENTOR.
Joseph J. Megal
BY
Lieber & Lieber
ATTORNEYS.

Patented Jan. 14, 1947

2,414,316

UNITED STATES PATENT OFFICE 2,414,316

TWISTED BELT AGITATOR

Joseph J. Megal, Milwaukee, Wis., assignor to Philip C. Read, Milwaukee, Wis.

Application August 31, 1946, Serial No. 694,230

2 Claims. (Cl. 259—54)

The present invention relates in general to improvements in the art of mixing and agitating, and relates more specifically to improvements in the construction and operation of twisted belt conveyors for simultaneously transporting and agitating a series of commodity laden containers such as beverage filled bottles.

The primary object of my invention is to provide a simple and efficient means for mixing and agitating bottled beverages and the like by carrying the bottles or other containers in a spiral path through the medium of a pair of twisted belts.

It has heretofore been proposed to utilize a pair of endless conveyor belts having adjacent stretches twisted about each other and cooperable with a succession of articles so as to grip and transport articles such as sheets of paper, from one locality to another. These prior devices have apparently proven quite satisfactory for such specific purposes, but when it was attempted to utilize such a conveyor for the purpose of transporting articles having more massive bodies, such as commodity laden containers or liquid filled bottles, considerable difficulty was encountered especially in the proper delivery of the successive articles in upright condition at the end of the conveying zone.

In the manufacture of certain beverages, it is desirable to thoroughly agitate the batch of liquid confined in each of the final containers or bottles, before delivery thereof to the trade, and this agitation is preferably effected while the individual liquid filled bottles are being transported in rapid succession toward the final packing crates or cases. I have found that by properly constructing the receiving and delivery ends of a twisted belt conveyor, such a device may be utilized to simultaneously agitate the liquid batches and to transport the same automatically and in uninterrupted series from a rapidly advancing supply line to a similarly advancing discharge line, in upright position and in a most effective manner.

It is therefore a more specific object of the present invention to provide an improved twisted belt agitator which is especially adapted for use in the beverage and canning industries for the purpose of rapidly and effectively agitating confined batches of diverse commodities, as they are being transported in succession from place to place.

Another specific object of the invention is to provide an improved conveyor assemblage which is operable to automatically revolve and transport a series of individual liquid filled containers such as glass jars or bottles from one locality to another, and which will automatically right the successive bottles and deliver the same in upright condition from the revolving zone.

A further specific object of this invention is to provide an improved device for simultaneously advancing and thoroughly agitating successive batches of liquid or the like confined within elongated substantially cylindrical containers, while the liquid filled receptacles are proceeding along an approximately horizontal and straight path.

Still another specific object of my invention is to provide a simple, compact and durable twisted belt and agitator for relatively frail articles such as commodity filled glass jars or bottles, which is safely operable at high speed and with minimum attention and which may also be readily adjusted to effectively cooperate with receptacles of diverse sizes and shapes.

An additional specific object of my present invention is to provide an improved bottled beverage agitator, which is reliable in operation, and which may also be manufactured, installed, and operated at moderate cost.

These and other specific objects and advantages of the invention will be apparent from the following detailed description.

A clear conception of the several features constituting my present improvement, and of the construction and operation of a typical twisted belt liquid filled bottle and agitator embodying the invention, may be had by referring to the drawings accompanying and forming a part of this specification in which like reference characters designate the same or similar parts in the various views.

Fig. 1 is a perspective view of a twisted belt liquid filled bottle and agitator, showing the assemblage in action, and looking toward the top and delivery end thereof;

Fig. 2 is a fragmentary perspective view looking downwardly upon the delivery end of the conveyor and agitator of Fig. 1 while inactive;

Fig. 3 is another perspective view of the assemblage of Figs. 1 and 2, looking directly toward the delivery end thereof while inactive;

Fig. 4 is an enlarged inside view of a fragment of the frame and left side pulley at the delivery end of the bottle conveyor and agitator;

Fig. 5 is a similarly enlarged inside view of a fragment of the frame and right side pulley at the delivery end of the same bottle conveyor and agitator; and Fig. 6 is a likewise enlarged diagram showing the bottle righting action of the pulleys and twisted belts at the delivery end of the improved assemblage.

While the invention has been shown and described herein as being advantageously applicable to a horizontal beverage filled glass bottle conveyor and agitator, it is not my desire or intention to unnecessarily limit the scope or utility of the improvements by virtue of this specific embodiment.

Referring to the drawings, the typical liquid filled bottle conveyor and agitator shown therein, comprises in general a rigid main frame having left and right hand opposite side portions 8, 9 respectively as viewed from the delivery end of the machine; front and rear pulleys 10, 11 respectively journalled for rotation near the left side portion 8 of the frame; front and rear pulleys 12, 13 respectively journalled for rotation near the right side portion 9 of the frame; a pair of sturdy endless belts 14, 15 coacting respectively with the left pulleys 10, 11 and with the right pulleys 12, 13, the belts having adjacent stretches 16, 17 respectively which are twisted about each other, and also having other straight stretches 18, 19 respectively remote from the twisted stretches 16, 17; and any suitable driving means such as power driven sheaves 20 applied to at least one pulley supporting shaft of each conveyor for imparting continuous rotary motion to the pulleys and advancing movement to the belts.

The main frame side portions 8, 9 may be rigidly constructed of stiff tubing or pipe sections welded or otherwise firmly united, and the portions 8, 9 are rigidly united by tubular cross beams 22 and by a screen or safety net 23 disposed beneath the belt stretches 16, 17, 18, 19 and extending throughout the length of the machine. A bottle supply line or guide 24 for conducting a continuous series of rapidly advancing liquid filled and sealed bottles 25 toward the front or inlet end of the frame between the front pulleys 10, 12, is provided at the front end of the machine; and a bottle delivery line or guide 26 for likewise conducting the agitated bottles 25 from the treating zone, is also provided at the discharge or rear end of the assemblage, see Fig. 1. The bottle delivery guide 26 may be supported from the main frame at any suitable elevation, with the aid of vertically adjustable brackets 27 as shown in Fig. 3, and the supply guide 24 may be likewise supported.

The pulleys 10, 11, 12, 13 are preferably of the crown or oppositely taper-faced type, and the front pulleys 10, 12 may be journalled for rotation upon approximately upright parallel shafts 29 adjustably secured to the front cross-beams 22 of the main frame, the pulley 10 being disposed somewhat higher than the pulley 12 in order to properly receive the upright articles or bottles 25. The rear pulleys 11, 13 are attached to shafts 30, 31 respectively which are journalled for rotation in durable yokes 32, 33, and these yokes are provided with stub shafts 34 which are rotatably adjustable in fittings 35 secured to the rear ends of horizontal elongated tubes 36, 37. The tube 36 at the left is normally disposed somewhat higher than the right tube 37, and each of these tubes 36, 37 is longitudinally slidably confined within a pair of U-shaped straps 38 by means of adjusting screws 39, and carry looped arms 40, 41. The straps 38 are firmly welded or otherwise secured to the adjacent side frames 8, 9 and the looped arms 40, 41 are adapted to be clamped to the adjacent tubes 36, 37 in various positions of angular adjustment and slidably engage the frame portion 8 and a pin 42 rigidly secured to the opposite frame member 9, respectively. The arms 40, 41 normally prevent rotation of the tubes 36, 37 about their own axes, but may be adjusted so as to vary the angularity of the corresponding pulley supporting stub shafts 34 relative to the horizontal, and these stub shafts 34 may be rotatably adjusted within their carrier fittings 35 so as to vary the angularity of their respective pulley supporting shafts 30, 31 fore and aft.

The front pulleys 10, 12 and the rear pulleys 11, 13 are spaced apart sufficiently to permit free passage of the successive rapidly advancing articles or bottles 25 therebetween, and the belt stretches 16, 17, 18, 19 are normally subjected to considerable tension by means of compression springs 44, see Figs. 1, 2, 4 and 5. Each of these springs 44 coacts at one end with one of the rear pulley suspension fittings 35, and at its opposite end with a retainer plate 45 which in turn coacts with an adjusting screw 46. The screws 46 have screw threaded coaction with upright posts 47 firmly secured to the cross-beams 22 of the main frame by means of U-bolts 48, and the springs 44 when properly tensioned serve to maintain the belts 14, 15 taut at all times, and cause the twisted belt stretches 16, 17 to normally hug each other in helical fashion as clearly depicted in Fig. 1. The belts 14, 15 are preferably of the spring steel rubber coated type so as to insure proper resiliency and durability, and the belt supporting pulleys 10, 11, 12, 13 and their carrier shafts may be journalled in anti-friction bearings in order to reduce the power consumption to a minimum. The belt tensioning mechanisms comprising the springs 44 are preferably located as near to the outer straight stretches 18, 19 as possible in order to reduce the pulley overhang as much as possible, and the sheave 20 may ordinarily be driven by a V-belt from any suitable source of power.

When the various parts of the improved twisted belt agitator have been properly constructed and assembled as above described, the angularity of the rear pulley shafts 30, 31 and the location of the adjacent pulleys 11, 13 must first be properly adjusted so as to cause the twisted belt stretches 16, 17 to properly cooperate with and to right the successive liquid filled and cap sealed bottles 25. Since these bottles 25 have rounded lower edges, they must be delivered to the discharge guide 26 in perfectly upright position in order to eliminate subsequent toppling and bottle breakage, and in order to insure such delivery of the bottles 25 from the agitating zone, the left rear pulley 11 should be disposed somewhat higher than the right rear pulley 13, and the former should also be tilted forwardly and inwardly, while the latter should be inclined rearwardly and outwardly away from the path of travel of the bottles. The lower pulley 13 must however be tilted upwardly considerably more than the pulley 11 in order to compensate for loading of the belts 14, 15 at their delivery ends. The proper elevation of the pulleys 11, 13 and the angularity of their axes, may be varied by utilizing the adjusting screws 39 to position the tubes 36, 37 at the desired heights, and by utilizing the arms 40, 41 to swing these pulleys up or down about the tube axes; and the stub shafts 34 of the yokes 32, 33 may be rotatably adjusted within the fittings 35 so as to swing the pulleys 11, 13 fore and aft. The arms 40, 41 also serve to predetermine the relative angularity of the rear pulley axes with respect to each other so as to compensate for belt loading, and the stub shafts 34 may be adjusted longitudinally of their axes in order to vary the width of the gap between the pulleys 11, 13, thus providing a flexible and universal adjustment for the discharge pulleys.

After the conveyor pulleys 10, 11, 12, 13 have been properly positioned and the belts have been properly tensioned with the aid of the springs 44 and adjusting screws 46, the machine may be set in motion by applying rotary motion to the sheave 20 at any desired speed. The successive liquid filled bottles 25 may then be delivered from the supply line 24 to the inlet end of the conveyor, in upright position and in rapid succession, and the entering bottles 25 will spread the twisted belt stretches 16, 17 apart and will be firmly clamped between these stretches and conveyed thereby along the agitating zone above the net 23. During this advancement of the bottles 25, the twists of the belt stretches 16, 17 will simultaneously revolve the bottle series and cause it to proceed along a helical path, thereby thoroughly agitating the contents of each bottle and eventually delivering the bottles 25 in succession through the gap between the tilted rear pulleys 11, 13 to the discharge line 26 in perfectly upright position. This delivery of the bottles takes place smoothly and gently, and the treatment and transportation of the liquid filled containers is thus effected automatically and at high speed without danger of breaking the bottles, or damaging labels.

From the foregoing detailed description of the construction and operation of the assemblage, it will be apparent that my invention provides an improved twisted belt agitator which besides being simple and durable in construction, is flexible in its adaptations and highly efficient in operation. The improved conveyor functions to simultaneously transport the bottles 25 along a helical path, and to revolve the containers about transverse axes, thereby insuring most effective agitation of the contents of each bottle; and these operations are carried on automatically and without interruption while the bottle series is advancing at high speed. The various adjustments of parts may be readily effected so as to insure most effective functioning of the machine, and to cause these parts to cooperate with containers of different sizes and shapes, and the disposition and angularity of the discharge pulleys 11, 13 is an important feature of my invention. This disposition of the pulleys enables the conveyor to operate horizontally and to carry considerable weight without releasing the bottles.

It is to be noted that when the machine is operating idly, the belt 14 is riding along the upper portion of the rear pulley 11 whereas the belt 15 is riding along the lower portion of the rear pulley 13, as shown in Fig. 3. However, when the conveyor is loaded with bottles, the belt 14 rides upon the lower portion of the pulley 11 while the belt 15 simultaneously rides along the upper portion of the pulley 13, as clearly indicated in Figs. 1 and 6. This movement of the belts relative to the pulleys takes place automatically as the machine is loaded and emptied, and the angular disposition of the pulleys 11, 13 combined with the location thereof relative to each other, prevents the belts 14, 15 from leaving the pulleys and insures smooth and gentle delivery of the treated bottles in perfectly upright condition. The containers or bottles 25 may also be revolved any desired number of times while travelling through the agitating zone, by merely increasing or diminishing the number of twists in the belt stretches 16, 17. The improved assemblage may obviously be manufactured, installed and operated at very moderate cost and with minimum attention, and has proven highly satisfactory and successful in actual commercial use.

It should be understood that it is not desired to limit this invention to the exact details of construction, operation and use, herein shown and described, for various modifications within the scope of the appended claims, may occur to persons skilled in the art. It is also to be noted that the assemblage is adapted for advantageous use in connection with commodity laden containers other than beverage filled bottles, and that the various parts may be formed of any suitable materials other than those specifically recited.

I claim:

1. A machine for mixing and agitating the contents of sealed containers by turning filled containers about their transverse axes in a spiral path comprising a pair of driven endless belts disposed wholly in a single plane having their adjacent stretches normally contacting and twisted about one another in a spiral path for gripping filled containers when positioned therebetween, laterally spaced pulleys supporting the inlet ends of said belts in non-contacting spaced relation for receiving containers of an appreciable size in diameter therebetween in upright position, laterally spaced pulleys supporting the outlet ends of said belts in non-contacting spaced relation for the passage of said containers of an appreciable size in diameter therebetween from the twisted stretches in an upright position, and means for exerting a continuous tension on both of said belts to maintain the twisted stretches in tight gripping contact.

2. A machine for mixing and agitating the contents of sealed containers by turning filled containers about their transverse axes in a spiral path comprising a pair of driven endless belts disposed wholly in a single plane having their adjacent stretches normally contacting and twisted about one another in a spiral path for gripping filled containers when positioned therebetween, laterally spaced pulleys supporting the inlet ends of said belts in non-contacting spaced relation for receiving containers of an appreciable size in diameter therebetween in upright position, laterally spaced pulleys supporting the outlet ends of said belts in non-contacting spaced relation for the passage of said containers of an appreciable size in diameter therebetween from the twisted stretches in an upright position, the outlet pulley on the loaded side of said twisted stretches being inclined relative to the other of said outlet pulleys and at an angle to the vertical for supporting the loaded side and to guide the containers to an upright position.

JOSEPH J. MEGAL.